July 31, 1962

R. C. LENT 3,047,240

IRRIGATION UNIT

Filed Dec. 30, 1960

INVENTOR
RALPH C. LENT

BY Mauro & Lewis
ATTORNEYS

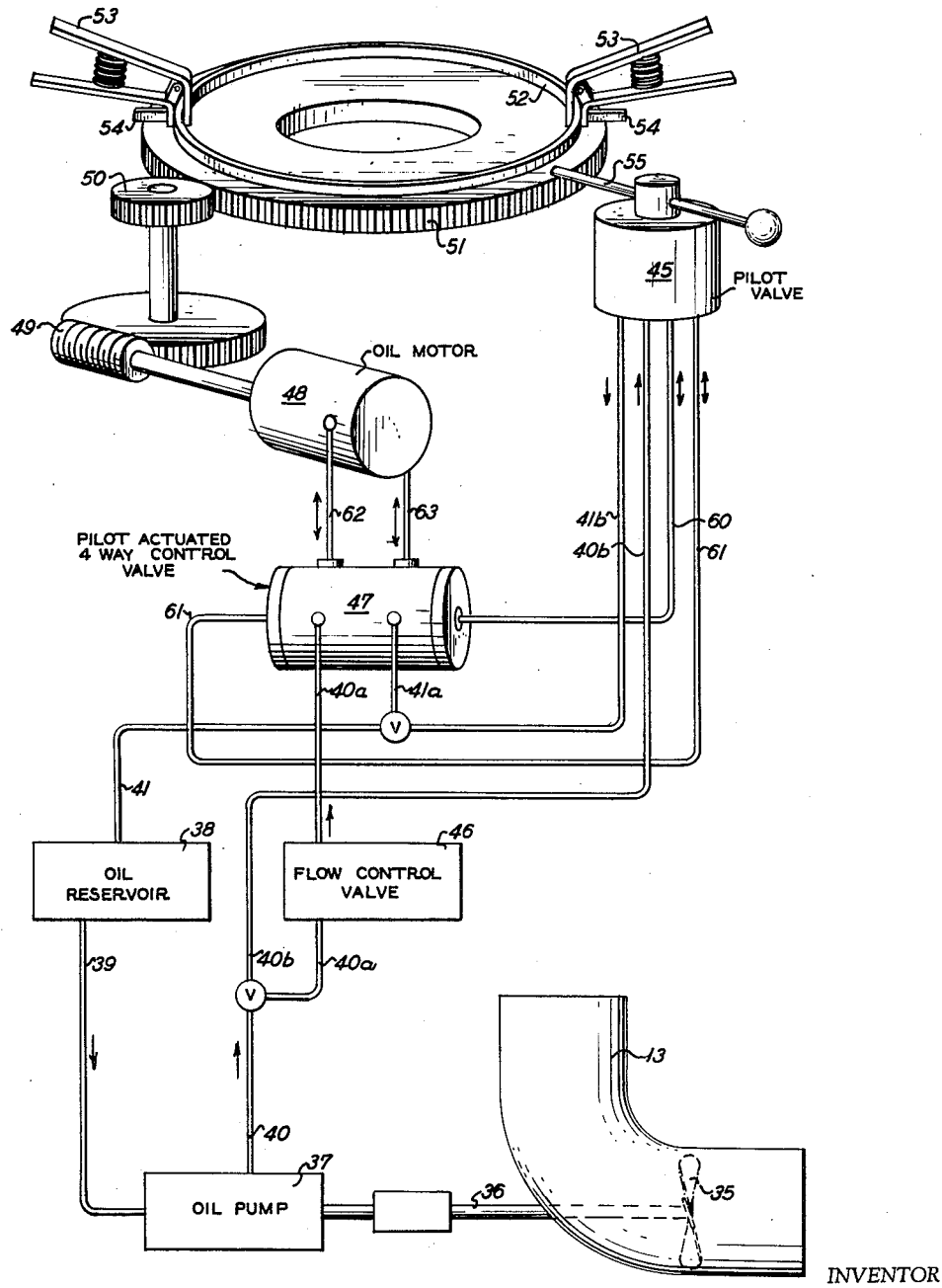

United States Patent Office 3,047,240
Patented July 31, 1962

3,047,240
IRRIGATION UNIT
Ralph C. Lent, Ewa, Hawaii, assignor, by mesne assignments, to Hanawai Manufacturing Company, Limited, Honolulu, Hawaii, a corporation of Hawaii
Filed Dec. 30, 1960, Ser. No. 79,756
9 Claims. (Cl. 239—265)

This invention relates to an overhead irrigation unit or sprayer for use in watering fields, plantations, orchards, and the like.

The device may be mounted on the ground or any platform of suitable elevation, or it may be vehicle mounted, and it operates from and is driven by any sufficient source of water under pressure.

One of the objects of the invention is to provide a sprayer having several novel features. The sprayer of the invention is characterized by a power-driven nozzle mounted for rotational or oscillating movement, so that the device may spray in a complete 360° circle, or in any lesser selected segment thereof. Accordingly, the device may be operated from a road, for example, and be so adjusted that only the field at one side will be sprayed. Or, the device may be adjusted to spray only the corner of a square field, having been set at a 90° angle.

Furthermore, the device embodies means for adjusting the axis of rotation of the nozzle with respect to the main body of the device and its support, so that the spray may be directed to the desired segment to be covered with best results with regard to the slope of the ground and the wind conditions. This feature is especially important where strong wind conditions prevail, the tilt of the nozzle being adjustable to spray relatively low into the wind for best penetration, and to spray relatively high in the down-wind direction, to prevent the wind from driving the water into the soil or the plants with resultant damage. Further, the nozzle tilt is adjusted by changing the angle of tilt of the swivel joint on which the nozzle is rotated, thus assuring that the nozzle will assume the same spray angle at any given point during successive cycles of rotation.

The device also includes means for adjusting the speed of rotation or oscillation of the spray nozzle. The speed of rotation may thus be adjusted to the speed of the wind on the down-wind run to obtain maximum throw, to improve the pattern of distribution under varying conditions.

The invention is characterized by a base member which, as noted, may be ground, platform or vehicle mounted, and an upper tiltable member or housing carrying a swivel joint with the spray nozzle mounted for rotary or oscillatory movement, and connected to the source of water by a flexible pipe section. The upper member carrying the nozzle is connected to the base by a gimbal type joint and other means to adjust tilt of swivel joint and hence the axis of rotation of the swivel joint and nozzle carried thereby.

A fluid pump carried by the base and a fluid motor carried by the upper member and geared to rotate the nozzle, form parts of a novel hydraulic drive having its own hydraulic system which is separate and distinct from the source of water, although driven thereby.

These and other features of the invention, such as the drive controls, will be further described in connection with the drawing, wherein:

FIG. 2 is a diagrammatic or schematic plan of the actuating and control elements.

Figure 1:
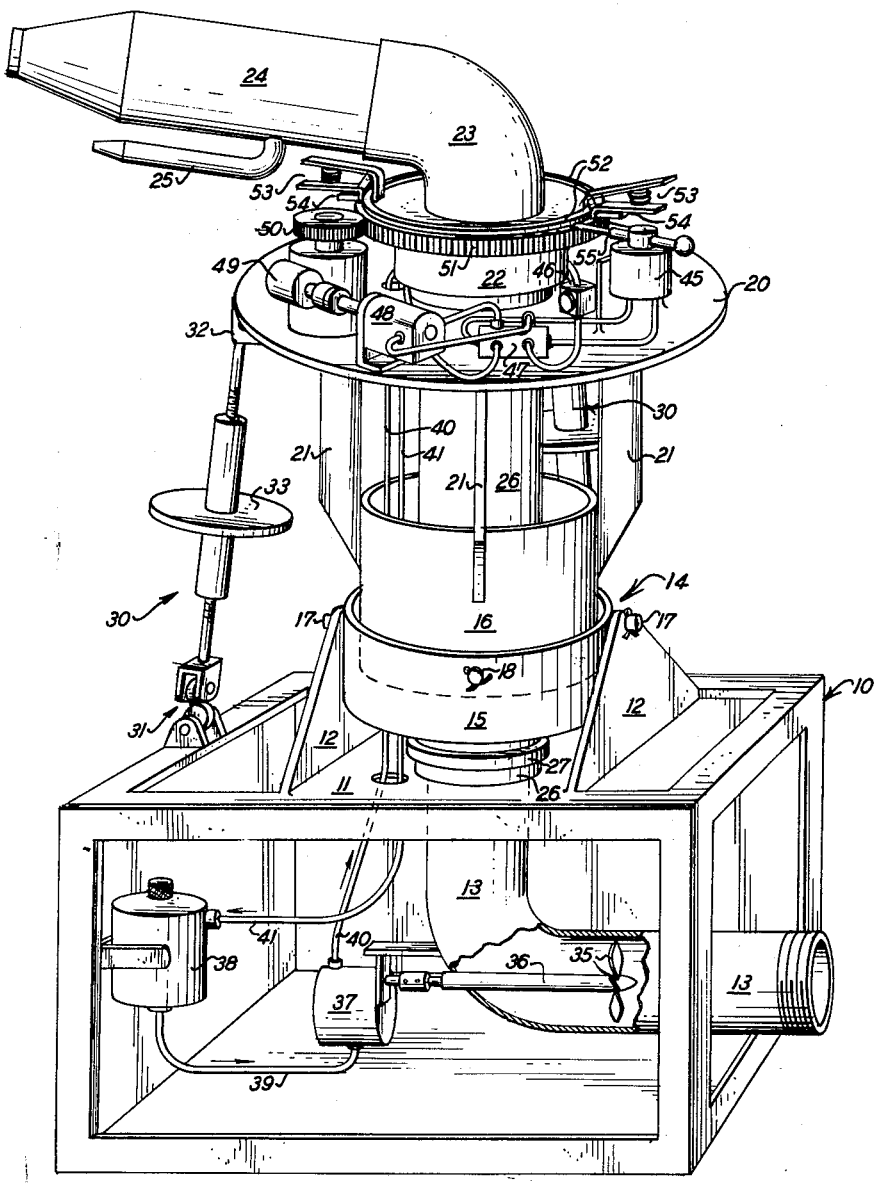
FIG. 1 is a perspective view of the invention.

The device is composed of a base or main frame 10, preferably formed in a skeletal box shape of welded angle iron. The top portion includes platform 11, having a pair of upstanding spaced pivot mounts 12. Fixed in a hole centrally of platform 11 is the intake pipe elbow 13, which is attached to a source of water under pressure, not shown.

Pivoted to mounts 12 is a hollow gimbal joint generally indicated at 14, which consists of a pivoted lower ring 15 in turn supporting a pivoted upper ring 16, the pivot connections being indicated at 17 and 18.

The upper control platform or tilt stand 20 is attached by four supporting legs 21 to the upper ring 16, and carries, through a central aperture, a swivel joint 22 leading to pipe elbow 23 and spray nozzle 24, making the latter rotatable. An auxiliary spray nozzle 25 is also shown. The lower of fixed part of swivel joint 22 is connected to intake pipe elbow 13 by means of a flexible hose section 26 and a suitable hose clamp 27. The flexibility of hose 26 permits the tilt stand 20, swivel joint 22 and nozzle 24 to be tilted in any plane via the gimbal joint 14 with respect to main frame 10.

The means for setting and securing tilt stand 20 and nozzle 24 at the desired pitch or angle consists of a pair of turnbuckles 30 mounted at 90° angles with respect to each other and bridging the space between frame 10 and stand 20. Each turnbuckle 30 is pivotally mounted to frame 10 by a universal joint 31 and to tilt stand 20 by a pivot joint 32. Rotation of the control nuts 33 in the selected direction reduces or enlarges the length of each turnbuckle and hence applies leverage to the control platform 20 to alter its pitch or angle in any plane with respect to main frame 10.

The driving and control means will next be described.
The primary source of power for the device is the water power passing into intake pipe 13 from a suitable source, not shown. Mounted in pipe 13 is a propeller 35 whose shaft 36 passes externally of pipe 13 through a fluid tight passage and is connected to a fluid pump 37, which also may be mounted on pipe 13, as shown. Pump 37 is preferably an oil pump operating on a supply of oil from a reservoir 38 through the suction line 39. Pressure oil line 40 and return line 41 lead to the control platform 20, where the remaining control devices are located. Accordingly, the movement of water into pipe 13 actuates propeller 35 which in turn actuates oil pump 37 to force oil into the pressure line 40, as indicated by the flow arrows. It will be understood that oil lines 40 and 41 are formed with sufficient flexibility to accommodate the tilting of platform 20.

Mounted on the control platform are (from right to left, FIG. 1): a pilot valve 45, a manual flow control valve 46, a four-way control valve 47 actuated by the pivot valve 45, an oil motor 48, a worm reduction gear 49 and a driving pinion 50. Around the upper periphery of ring gear 51 is mounted an upstanding ring or flange which is termed a stop ring 52 adapted to carry a pair of clamp-like stop members 53 which may be clamped to any selected locations on ring 52. Stop members 53 are spring actuated and provided with ears 54 which are designed to contact with the trip arm 55 of pilot valve 45 during rotation of gear 51, as will be further described.

The oil line connections will be better understood by reference to FIG. 2.

Pressure line 40 is divided adjacent platform 20, branch 40a thereof leading through control valve 46 into an intake port of control valve 47, the other branch 40b leading to the pilot valve 45. Return line 41 is also branched, branch 41a leading from valve 47, branch 41b leading from valve 45, to a junction point with line 41 which returns to reservoir 38. Another pair of oil lines 60—61 connect the pilot valve with the actuating ports of the four-way valve 47. A further pair of oil lines 62—63 connect the four-way valve 47 to the oil motor.

Operation of the invention will next be described.

The device is taken to the desired location and coupled to a source of water under pressure. The tilt stand or control platform 20 is first adjusted by means of turnbuckles 30 so that the nozzle 24 is adjusted to rotate or oscillate at the desired pitch in the sector selected for irrigation, this being done by taking into consideration the terrain and the wind direction.

Next, the stops 53 are adjusted or located on ring 52 to trip pilot valve 45 at two points corresponding to the extremes of the sector to be irrigated. If it is desired to spray in a complete circle the stops 53 may be placed close together, so that the nozzle will oscillate in a complete circle, and then counter-rotate in the opposite direction. This will produce a symmetrical pattern around the sprinkler.

Water passing into pipe 13 will actuate propeller 35 and oil fluid will be driven by pump 37 into line 40 and its branches, thus actuating oil motor 48 in the direction dictated by the setting of control valve 47. When the control arm 55 of pilot valve 45 is tripped by a stop 53, the flow of fluid in lines 60 and 61 is reversed. This in turn actuates control valve 47 to reverse the flow of fluid in lines 62 and 63 leading to motor 48, reversing the movement of the latter. This reversal is carried by gears 49, 50 and 51 to cause reversal of the rotational movement of nozzle 24. The reversed movement of the nozzle will be maintained until pilot valve 45 is again tripped by the second stop member 53, in which event valve 45 returns control valve 47 to its first position, the latter again actuating motor 48 in its original direction of rotation.

During either phase of movement, the return oil lines 41 are returning oil to the reservoir 38 for re-use, thus completing the hydraulic circuit.

In the foregoing description, no detailed explanation of the internal mechanism of the oil pump, oil motor, pilot valve, and four-way valve is given, since these elements are per se conventional, and commercially available in several makes known to the art.

By way of further explanation, however, the oil pump and oil motor may advantageously be of the "gear type" well known in the art, as shown in the patents to McClatchie, No. 1,689,791, dated Oct. 30, 1928, Fullerton, No. 1,702,046 dated February 12, 1929, or Herman, No. 2,395,824 dated March 5, 1946. Such devices are featured by a housing containing two orifices providing fluid flow between a pair of intermeshing gears, one gear being connected to an external shaft. If the shaft is driven (e.g. pump 37) the device acts as a pump. If the fluid motivates the gears (e.g. motor 48), the device acts as a motor.

The pilot valve may be any suitable valve serving to reverse the fluid flow from two incoming lines into two egress lines, as shown in the patents to Vickers, No. 2,182,459 dated Dec. 5, 1939 or to Parker, No. 2,229,932 dated Jan. 28, 1941.

The pilot actuated 4-way control valve may also be any valve of the type adapted for shifting by hydraulic actuation, such as shown in the patent to Schottler, 1,787,328 dated Dec. 20, 1930.

From the above disclosure it will be appreciated that an irrigation unit or sprayer has been invented which incorporates a number of adjustable features providing versatile and economic operation. In most areas where irrigation is needed, the water supply is short and must be applied with the utmost efficiency. Any irrigation involves considerable expense, which will be found to be substantially reduced by the mode of operation of the invention, due to the fact that large volumes of water may be correctly applied over larger areas from one machine by employing whatever tilt of axis of rotation, counter-rotation, and speed of rotation is best suited to the slope of the land, wind conditions, and shape of the area to be irrigated.

Further, it should be appreciated that the novel hydraulic oil drive of the invention and its related controls, is advantageously adapted to the device, providing a unique driving system for a device of this sort.

What is claimed is:

1. An irrigation device including in combination a base member, a spray nozzle, a swivel joint having fixed and rotary portions, said nozzle being mounted on said rotary portion of said swivel joint, a water intake adapted for attachment to a source of water under pressure, a flexible pipe connecting said water intake to said fixed portion of said swivel joint, driving means motivated by fluid pressure connected to said rotary portion of said swivel joint for rotating the latter, means tiltably supporting said swivel joint on said base member, and adjusting means connected between said base member and said swivel joint for setting the tilt of the latter and simultaneously the axis of rotation of said spray nozzle.

2. The invention according to claim 1, wherein the means tiltably supporting said swivel joint on said base member consists of a gimbal joint.

3. The invention according to claim 1, wherein the adjusting means includes a pair of turnbuckles.

4. An irrigation device including, in combination, a base member, a spray nozzle revolvably mounted on said base member, an intake pipe adapted for connection to a source of irrigation water under pressure and connected to said spray nozzle; power means for revolving said nozzle, including a mechanical power take-off adapted for connection to said source of water under pressure, a fluid pump mechanically connected to said power take-off and driven thereby, a fluid-driven motor, fluid conduits connecting said fluid pump to said fluid motor, and mechanical means driven by siad motor connected to said nozzle revolving the latter.

5. The invention according to claim 4, wherein the power take-off consists of a shaft in said intake pipe, and a propeller mounted therein on said shaft, said shaft extending externally of said intake pipe and being connected to said fluid pump.

6. The invention according to claim 4, including means for reversing the flow of hydraulic fluid to said motor and consequently reversing the rotational movement of said nozzle.

7. The invention according to claim 6, wherein the means for reversing the flow of fluid consists of control valves in the hydraulic system having a trip actuated by stops carried by said nozzle, said control valves being adapted to reverse the flow of hydraulic fluid to said motor.

8. The invention according to claim 6, wherein the means for reversing the flow consist of a pilot valve in the hydraulic system having a trip actuated by at least one stop carried by said nozzle said pilot valve actuating a control valve adapted to reverse the flow of hydraulic fluid to said motor.

9. An irrigation device including, in combination, a base member, an upper tiltable support member, a gimbal joint connecting said upper support member to said base member, extensible adjusting means extending from said upper support member to said base member for setting the degree of tilt of the former with respect to the latter, a hollow swivel joint having fixed and rotary portions, the fixed portion being fixedly mounted in said upper support member, a spray nozzle attached to said rotary portion of said swivel joint, a fluid driven motor carried on said upper support member, gear means connecting said rotary portion of said swivel joint and said nozzle with said motor; said base member containing an intake pipe adapted for connection with a source of water under pressure, and a fluid pump connected to the interior of said intake pipe by power take-off means, a flexible water conduit connecting said intake pipe to said swivel joint, and flexible fluid conduits connecting said fluid pump to said fluid-driven motor.

References Cited in the file of this patent

UNITED STATES PATENTS

| | | |
|---|---|---|
| 691,419 | Vandervoort | Jan. 21, 1902 |
| 757,160 | Vandervoort | Apr. 12, 1906 |
| 2,970,774 | Li | Feb. 7, 1961 |